(12) United States Patent
Kim et al.

(10) Patent No.: US 11,407,364 B2
(45) Date of Patent: Aug. 9, 2022

(54) THIN-WALLED CAMERA MODULE HOUSING WITH INTEGRATED CONNECTOR FABRICATED BY METAL POWDER INJECTION MOLDING PROCESS AND CAMERA MODULE FOR VEHICLE INCLUDING THE SAME

(71) Applicant: HYUNDAI MOBIS CO., LTD., Seoul (KR)

(72) Inventors: Hyung Min Kim, Yongin-si (KR); Sang Hwan Oh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/060,223

(22) Filed: Oct. 1, 2020

(65) Prior Publication Data
US 2021/0323485 A1    Oct. 21, 2021

(30) Foreign Application Priority Data
Apr. 20, 2020    (KR) .......................... 10-2020-0047199

(51) Int. Cl.
*B60R 11/04*    (2006.01)
*H04N 5/225*    (2006.01)
(Continued)

(52) U.S. Cl.
CPC .............. *B60R 11/04* (2013.01); *B22F 3/225* (2013.01); *G03B 17/02* (2013.01); *G03B 17/55* (2013.01);
(Continued)

(58) Field of Classification Search
CPC .... B60R 11/04; H04N 5/2251; H04N 5/2252; H04N 5/22521; H04N 5/2253;
(Continued)

(56) References Cited

U.S. PATENT DOCUMENTS 9,462,165 B2    10/2016  Moon et al.
2012/0019940 A1 *  1/2012  Lu .......................... H04N 5/2257
                                                                359/819
(Continued)

FOREIGN PATENT DOCUMENTS

JP    2008-170801    7/2008
JP    2016-065582    4/2016
(Continued)

*Primary Examiner* — Twyler L Haskins
*Assistant Examiner* — Akshay Trehan
(74) *Attorney, Agent, or Firm* — H.C. Park & Associates, PLC

(57) ABSTRACT

A vehicle camera module includes: a lens module; a circuit board including an image sensor; a front, metal powder injection molded housing having a front side assembled with the lens module and a rear side assembled with the circuit board configured to be received within the front housing; and a rear, metal powder injection molded housing assembled to the rear side of the front housing, the front housing having a rear surface and including a pocket portion formed inward toward the front side, and the rear housing including front edges and protrusions extending in lateral directions from the front edges and an insertion portion accommodated in the pocket portion.

12 Claims, 15 Drawing Sheets

(51) Int. Cl.
*G03B 17/02* (2021.01)
*G03B 17/55* (2021.01)
*B22F 3/22* (2006.01)

(52) U.S. Cl.
CPC ......... *H04N 5/2252* (2013.01); *H04N 5/2257* (2013.01); *G03B 2217/002* (2013.01)

(58) Field of Classification Search
CPC .... H04N 5/2254; H04N 5/2257; G03B 17/00; G03B 17/02; G03B 17/55; G03B 2217/002; H05K 1/0201–021; H05K 7/2039–20518; B22F 3/225
See application file for complete search history.

(56) References Cited

U.S. PATENT DOCUMENTS

| | | | |
|---|---|---|---|
| 2013/0242099 A1* | 9/2013 | Sauer | H04N 5/2257 348/148 |
| 2014/0298642 A1* | 10/2014 | Sesti | B60R 11/04 29/592.1 |
| 2017/0208227 A1* | 7/2017 | Tsuchida | H04N 5/2252 |
| 2018/0098033 A1* | 4/2018 | Mleczko | H04N 7/183 |
| 2019/0179215 A1* | 6/2019 | O' Connor | H04N 5/2254 |
| 2020/0236266 A1* | 7/2020 | Krammer | H04N 5/22521 |

FOREIGN PATENT DOCUMENTS

| | | |
|---|---|---|
| KR | 10-2014-0111503 | 9/2014 |
| KR | 10-2019-0126288 | 11/2019 |

\* cited by examiner

THIN-WALLED CAMERA MODULE HOUSING WITH INTEGRATED CONNECTOR FABRICATED BY METAL POWDER INJECTION MOLDING PROCESS AND CAMERA MODULE FOR VEHICLE INCLUDING THE SAME

CROSS-REFERENCE TO RELATED APPLICATION

This application claims priority from and the benefit of Korean Patent Application No. 10-2020-0047199, filed Apr. 20, 2020, which is hereby incorporated by reference for all purposes as if set forth herein.

BACKGROUND

Field

Exemplary embodiments relate to a method of manufacturing a camera module housing for use with a vehicle.

The statements in this section merely provide background information related to the disclosure and do not necessarily constitute prior art.

Discussion of the Background

Newly released automobiles include at least one camera, and a higher number of cameras are used in more luxurious vehicles. As one of the Advanced Driver Assistance Systems (ADAS), the Around View Monitoring (AVM) system involves a camera installed for imaging the entire area around the vehicle.

The smaller the vehicle camera module, for example, a side mirror, the better, considering the limited installation space. The camera module housing has a complex construction including a contour for interconnection between at least a lens, a circuit board having an image sensor, and a connector, and it is generally injection molded from a plastic material. On the other hand, the image sensor tends to generate more heat as the resolution increases due to an increased amount of data to process.

The above information disclosed in this Background section is only for enhancement of understanding of the background of the invention and, therefore, it may contain information that does not constitute prior art.

SUMMARY

Applicant realized that a vehicle camera module having a housing that is completely sealed by welding or the like after assembly is an unfavorable structure for dissipating heat inside. A metal of high thermal conductivity is the preferred material of the housing, but a generally thin yet structurally complex one-piece housing component is not easily manufactured from a metallic material. When the structure of such a metallic material is produced by casting, casting defects such as an internal cavity are likely to occur, and sealing performance may be difficult to be secured when welding the cast parts Vehicle camera modules constructed according to the principles and exemplary implementations of the invention are capable of resolving one or more of the above deficiencies by manufacturing the front and rear housings by a metal injection molding (MIM) method.

Additional features of the invention will be set forth in the description which follows, and in part will be apparent from the description, or may be learned by practice of the invention.

According to one aspect of the invention, a vehicle camera module includes: a lens module; a circuit board including an image sensor; a front, injected-molded metal housing having a front side assembled with the lens module and a rear side assembled with the circuit board configured to be received within the front housing; and a rear, injected-molded metal housing assembled to the rear side of the front housing, the front housing having a rear surface and including a pocket portion formed inward toward the front side, and the rear housing including front edges and protrusions extending in lateral directions from the front edges and an insertion portion accommodated in the pocket portion.

The insertion portion of the rear housing may be press-fit into the pocket portion so that the insertion portion and the pocket portion cooperatively define a press-fit site to seal the front housing and the rear housing completely.

The insertion portion of the rear housing may have a rear surface and side surfaces with jointly formed edges, and the side surfaces having at least a partial side region extending from the edges and facing forwardly of the rear housing to be substantially perpendicular to a front surface of the insertion portion, the partial side region defining a press-fit surface.

The insertion portion may include a first tapered surface extending from the press-fit surface to the insertion portion so that the insertion portion has a reduced side profile toward the front surface of the insertion portion.

The press-fit surface may have a width in a front-rear direction determined by the depth of a heat-affected zone (HAZ) due to a laser welding to eliminate residual stress from the press-fit surface after the laser welding, the width of the press-fit surface being equal to or less than the depth of the heat-affected zone.

The pocket portion may have a depth that is substantially equal to a thickness of the insertion portion.

The pocket portion of the front housing may have a bottom surface and side surfaces that jointly form an inside corner having a corner radius of about 0.1 mm or more.

The front housing may have a thickness of about 0.5 mm to about 1.0 mm and a wall gradient of about 0.5° to about 1°.

The rear housing may have a primary side surface extending from an inside corner of the rear surface of the rear housing to a rear of the rear housing so that the primary side surface may include a second tapered surface.

The rear housing may be integrally formed with at least a portion of a standard radio frequency (RF) connector structure made by any one of USCAR17, USCAR18-4, and FAKRA (Fachkreis Automobil) standards.

The circuit board may be configured to dissipate heat, the circuit board having a ground pattern at least partially extending to a side surface of the circuit board wherein the ground pattern contacts an inner surface of the front housing when the circuit board is assembled within the front housing and thereby transfers heat generated from the circuit board to the front housing.

The metal injection molding method may utilize a powdered metallic material, including at least one of SUS 316L, SUS 304L, SUS 630, SUS 420 J2, SUS 440C, and SKD 11 per Japanese Industrial Standard, 2% Ni—Fe, 7% Ni—Fe, and HK30 per ASTM standard.

According to another aspect of the invention, a method of making a vehicle camera module includes the steps of: providing a lens module; providing a circuit board including an image sensor; manufacturing a front housing and a rear housing by metal injection molding; assembling the front housing having a front side with the lens module and assembling the rear side with the circuit board housed within the front housing; and assembling the rear housing to the rear side of the front housing, wherein the front housing may have a rear surface and includes a pocket portion formed inward toward the front side, and the rear housing is formed to have front edges and protrusions extending in lateral directions from the front edges and includes an insertion portion accommodated in the pocket portion.

After assembly, the front housing and the rear housing may be sealed and assembled together by laser welding irradiated along a rear side of the rear housing together by laser welding irradiating along a rear side of the rear housing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1A:
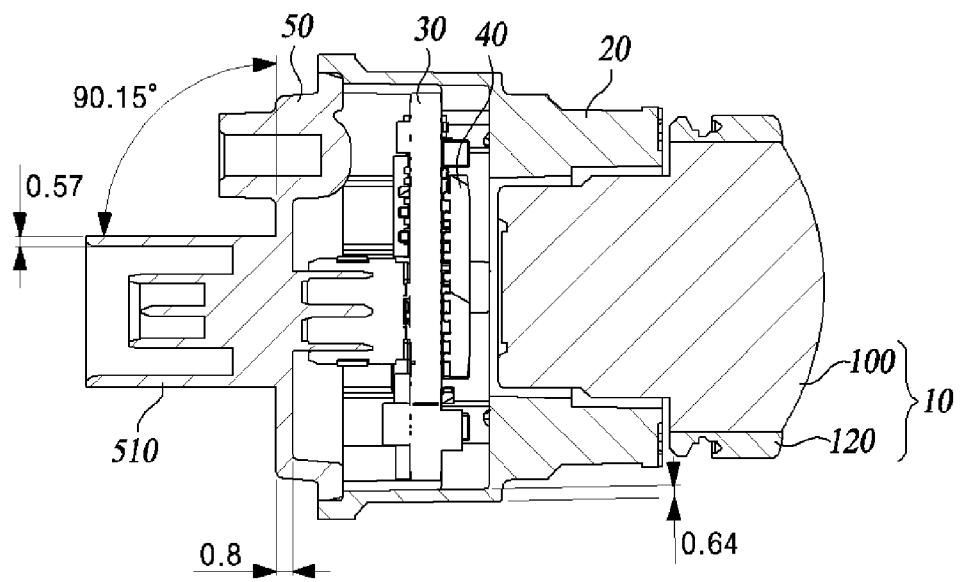
FIGS. 1A and 1B are cross-sectional and plan views, respectively, showing a camera module according to at least one embodiment of the disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

The disclosure in some embodiments seeks to provide a method of manufacturing a housing of a camera module, which employs a new method of manufacturing a front housing and a rear housing of the camera module by using metallic material for providing a generally thin housing and thereby securing a wide space for allocation to a printed circuit board (PCB) disposed of therein, resulting in an improved heat dissipation performance and guaranteed welding quality.

Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, the order or sequence of the components. Throughout this specification, when a part "includes" or "comprises" a component, the part is meant to further include other components, not excluding thereof unless there is a particular description contrary thereto. The terms such as "unit", "module", and the like refer to units for processing at least one function or operation, which may be implemented by hardware, software, or a combination thereof.

Figure 1B:
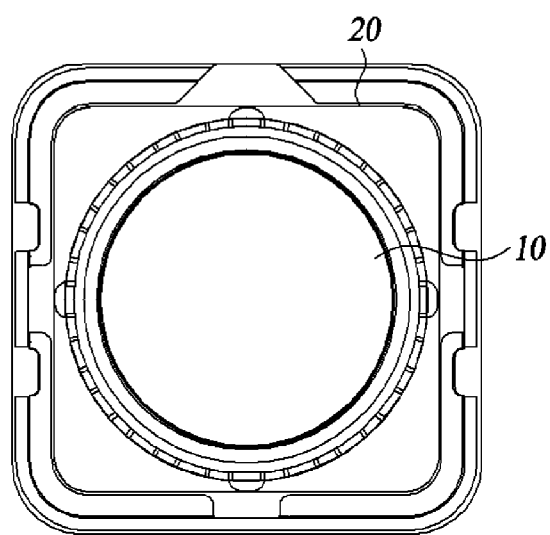

FIGS. 1A and 1B are cross-sectional and plan views, respectively, showing a camera module according to at least one embodiment of the disclosure.

As shown in FIGS. 1A and 1B, a camera module 1 according to at least one embodiment of the disclosure include all or some of a lens module 10 at the front, close to the subject area, a front housing 20, a circuit board or PCB 30, and a rear housing 50 arranged in this order.

The lens module 10 is assembled by fixing a plurality of lens elements 100 in a lens barrel 110 and closing the front of the lens barrel 110 with a retainer 120. The lens module 10 is pre-assembled in the front housing 20, and an image sensor 40 is mounted on the PCB 30. The front housing 20 and the PCB 30 are assembled after being optically aligned to correct an assembly error between the lens module 10 and the image sensor 40. The camera module 1 is received and sealed in the front housing 20 and the rear housing 50 so that the lens module 10 and the PCB 30 are prevented from being contaminated by an external environment.

Figure 2A:
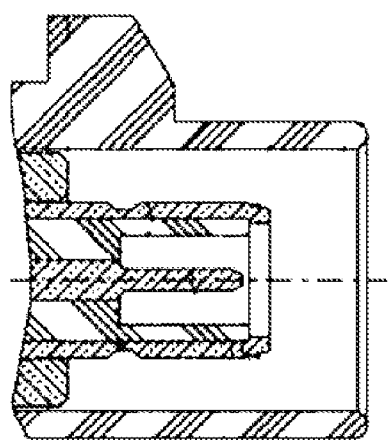
FIGS. 2A and 2B are a cross-sectional view showing a standard specification of a connector terminal mating portion of a camera module rear housing and an exploded perspective view of a camera module according to at least one embodiment of the disclosure, respectively.
Figure 2B:
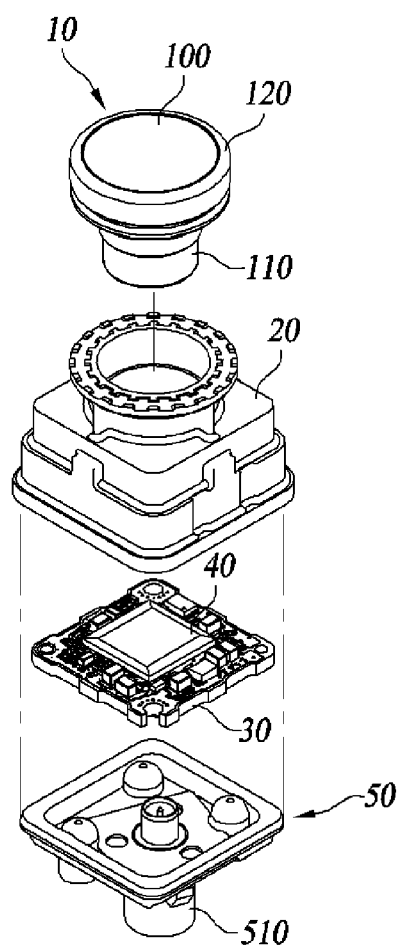

FIGS. 2A and 2B are a cross-sectional view showing a standard specification of a connector terminal mating portion of a camera module rear housing and an exploded perspective view of the camera module according to at least one embodiment of the disclosure, respectively.

As shown in FIG. 2B, the rear housing 50, according to at least one embodiment, is integrally formed with an RF connector 510 having the structure as illustrated in FIG. 2A to transmit the captured image data of the camera module 1. The RF connector 510 may be one made by the standards of USCAR17, USCAR18-4, and FAKRA (Fachkreis Automobil) standards. Applicable to the SMB-based RF connector 510, these are connector standards for high-speed information transmission in a vehicle that guarantees signal transmission of signal frequency of about 3 GHz, and lately, about 6 GHz. With the RF connector 510 integrally structured into the rear housing 50, a more improved RF shield can be provided. In addition, fabricating the complex structure of the complete rear housing 50 by Metal Injection Molding (MIM) or metal powder injection molding can minimize finish machining to improve productivity.

If conventional RF connectors of these standards were separately provided and assembled to the rear housing 50, it would be highly likely that the signal quality is reduced, as high-frequency signals being reflected from the contacts due to their contact resistance. On the contrary, since the RF connector 510, according to at least one embodiment of the disclosure, is integrally formed with the rear housing 50, a stable electromagnetic shield can be provided for a high-frequency signal of several GHz.

Metal powder injection molding is an advantageous method for manufacturing metal parts having a complex three-dimensional shape. It is a manufacturing process that combines injection molding technology in the plastic field and powdered metal sintering technology in the powder metallurgy field.

As prior art, a precision casting process such as lost wax and a die-casting process may be used to manufacture the housings of the camera module 1. However, when using the precision casting process, at least a thin part has poor flowability of molten metal and is prone to casting defects such as internal pores after solidification. Such internal pores may generate welding defects that fail to guarantee the sealing state of the housings when laser-welding the front housing 20 and the rear housing 50. The die-casting process is limited to Al, Zn, and other such low-melting-temperature materials due to the limited heat resistant temperature of the mold material, and it is difficult to secure the required housing hardness when manufactured in a thin profile.

The metal powder injection molding uses a fine powdered raw material having excellent sinterability. It can obtain a molded body of uniform density under appropriate injection molding conditions and can take advantage of shape optimization and temperature control in the sintering process, etc. to control the degree of shrinkage of the molded body to be fairly uniform during the sintering. In addition, the metal powder injection molding can sufficiently increase the sintering temperature so that the sintered product may be obtained by the relative density of even as high as at least about 95%. In the metal powder injection molding, the fine powder particles are molecularly bonded together through the sintering process, thereby significantly lowering the probability of generating internal pores. In addition, the front housing 20, according to at least one embodiment, may be manufactured to have a thickness of about 0.5 mm to about 1.0 mm and a wall gradient in a range of about 0.5° to about 1°.

In brief, the front housing 20 and the rear housing 50, according to at least one embodiment, can be manufactured to have the high relative density while providing the great thinness, thereby avoiding welding defects due to internal pores and the like and enhancing the welding quality.

The metal powder injection molding process may be performed according to a generally known method.

Materials for use as the fine metal powder may include SUS 316L, SUS 304L, SUS 630, SUS 420 J2, SUS 440C, and SKD 11 per Japanese Industrial Standard, 2% Ni—Fe, 7% Ni—Fe, and HK30 per ASTM standard among others. These materials have high rigidity and can guarantee the rigidity of the housing that is made to have thinness. In addition, the very materials having excellent weather resistance and environmental resistance obviate the need for additional surface treatment.

The camera module housings 20 and 50 according to at least one embodiment may be made to have sufficient thinness to provide a larger inner space for the same outer dimension.

TABLE 1

| Divided by | Module Size | Default Thickness (one-sided) | Wall Gradient (based on 30 mm) | PCB Size |
| --- | --- | --- | --- | --- |
| Current | 23 × 23 | 2 | 1.572 (3°) | 23 − 4 − 3.2 = 15.8 |
| Present Disclosure | 23 × 23 | 0.6 | 0.262 (0.5°) | 23 − 1.2 − 0.5 = 21.3 |
| | | 1.0 | 0.524 (1°) | 23 − 2 − 1 = 20 |

Table 1 shows the increased internal spaces and the resultant allowable sizes of the PCB 30 when the housing thickness is thinned based on the same outer dimension of 23×23 (mm). Compared to a conventional PCB of the same kind that has a one-sided dimension of 15.8 mm, the PCB 30, according to at least one embodiment, may have a one-sided dimension of 20 mm or more. Due to its increased size, the PCB 30 may be installed with more circuit components as needed, and even with circuit components of the same configuration, the PCB 30 may be advantageously configured to have a wider ground pattern for effective heat dissipation of the image sensor 40 and/or peripheral circuit elements.

Figure 3A:
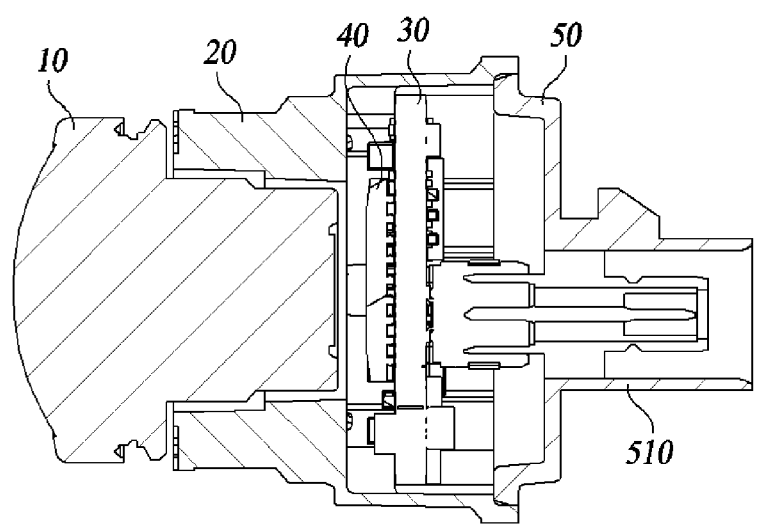
FIGS. 3A and 3B are cross-sectional views of the main part, including a front housing of a camera module according to at least one embodiment of the disclosure.
Figure 3B:
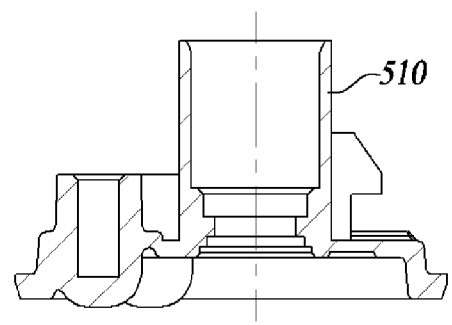

FIGS. 3A and 3B are cross-sectional views of the main part, including a front housing of a camera module according to at least one embodiment of the disclosure.

As shown in FIGS. 3A and 3B, the vehicle camera module 1 is manufactured by assembling at least the image sensor 40 and a lens in the form of a single module. The front housing 20 has its front side assembled with the lens module 10 and has its rear inner side assembled with the PCB 30 to which the image sensor 40 is attached. In the process of attaching the image sensor 40 to the PCB 30 and/or in the process of assembling a plurality of lens elements 100 to the lens barrel 110, a misalignment of the optical axis may occur. An incorrect image provided due to the misaligned optical axis will deteriorate the performance of the parking guide or automatic driving. Accordingly, each camera module 1 is subjected to a 6-axis optical alignment before fixing the lens module 10 and the image sensor 40 to each other to ensure a targeted optical performance. Upon completion of the assembly of the optical components, the front housing 20 is coupled with the rear housing 50 to form a sealed housing assembly.

In general, the front housing 20 and the rear housing 50 may be threadedly assembled, or they may be bonded with a resin adhesive. Distinctively, the front housing 20 and the rear housing 50 according to at least one embodiment of the disclosure are manufactured by metal powder injection molding, and the rear housing 50 is press-fit into the front housing 20 completed with the assembly of the optical components followed by laser welding and sealing the assembly boundary. Compared with a threaded coupling that may cause loosening due to frequent vibration and temperature changes during a vehicle's long life cycle, or a resin adhesive that may cause a gap in the sealed area due to aging, the laser-welded mating portion or joint can provide high stability and reliability.

Figure 4A:
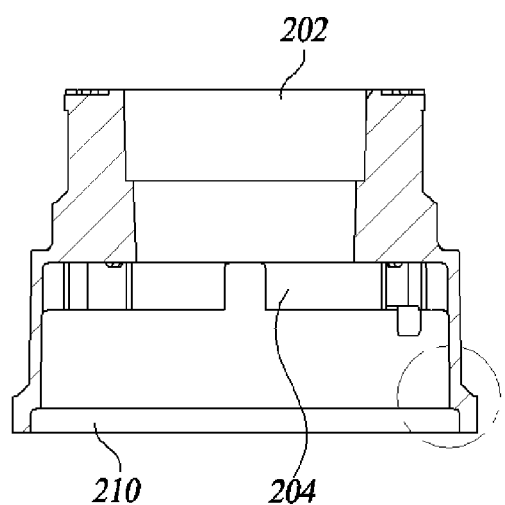
FIGS. 4A and 4B are a cross-sectional view of a front housing and a partial cross-sectional view of a front housing pocket portion in which a rear housing is accommodated respectively, according to at least one embodiment of the disclosure.
Figure 4B:
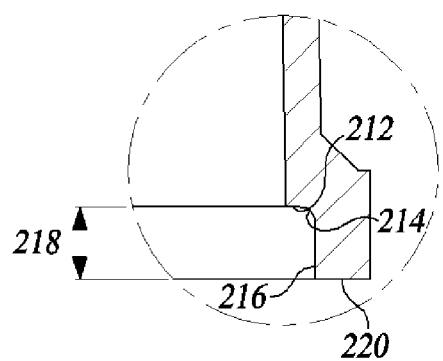

FIGS. 4A and 4B are a cross-sectional view of the front housing 20 and a partial cross-sectional view of a front housing pocket portion in which a rear housing is accommodated respectively, according to at least one embodiment of the disclosure.

Figure 5A:
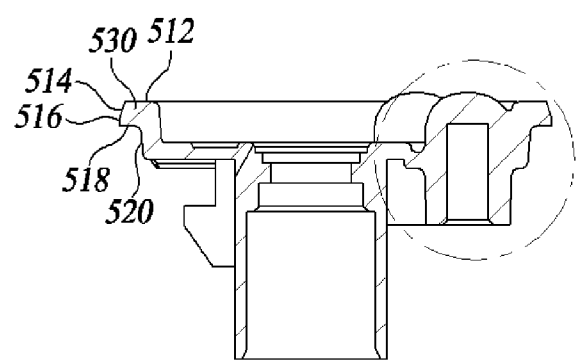
FIGS. 5A and 5B are a cross-sectional view of a rear housing and a partial enlarged cross-sectional view of a front housing insertion portion of a rear housing respectively, according to at least one embodiment of the disclosure.
Figure 5B:
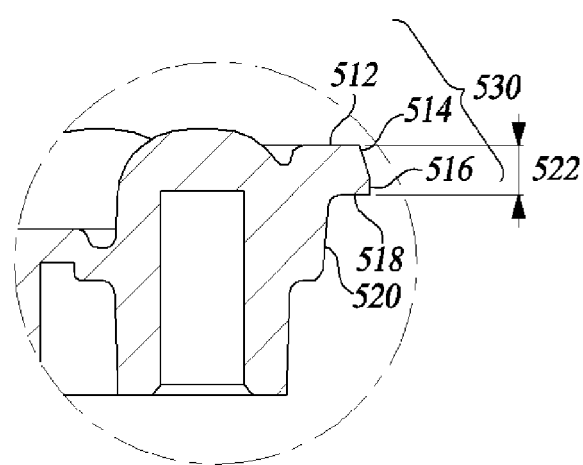

FIGS. 5A and 5B are a cross-sectional view of the rear housing 50 and a partial enlarged cross-sectional view of a front housing insertion portion of a rear housing respectively, according to at least one embodiment of the disclosure.

Figure 6:
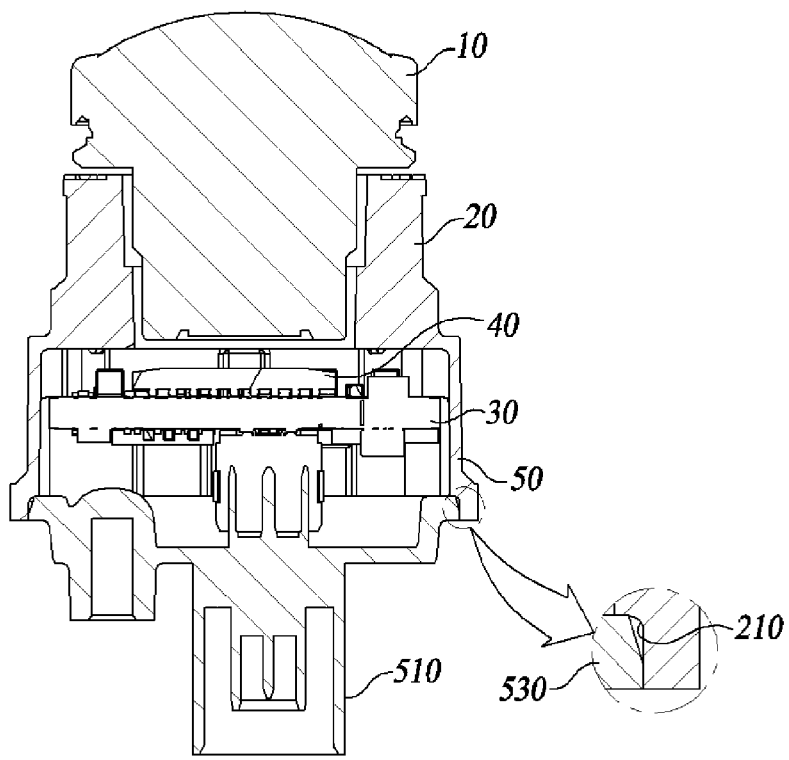
FIG. 6 is a cross-sectional view of a front housing and a rear housing assembled according to at least one embodiment of the disclosure.

FIG. 6 is a cross-sectional view of the front housing 20 and the rear housing 50 assembled according to at least one embodiment of the disclosure.

As shown in FIGS. 4A to 6, the front housing 20, according to at least one embodiment, includes a pocket portion 210 at its rear inner side, while the rear housing 50 includes an insertion portion 530 at its front outer side. The insertion portion 530 is press-fit into the pocket portion 210 of the front housing 20 so that their welding site undergoes a laser welding process for completely joining the front housing 20 and the rear housing 50 together.

According to at least one embodiment, the method of assembling the housing components can provide higher reliability of sealing by laser-welding an assembly boundary formed after press-fitting the mating portions. In addition, the portions to be press-fitted are so formed as to eliminate residual stress by welding, thereby minimizing the probability of defects occurring during the product life cycle.

The front housing 20 includes a lens-module recess 202 for accommodating the lens module 10, a PCB recess 204 for accommodating the PCB 30, and a rear-housing seat 210 in their entirety or part from front to rear. The PCB recess 204 is preferably formed so that at least a portion thereof is in contact with a heat conductor provided after the PCB 30 is disposed to dissipate heat generated from the PCB 30, such as a ground pattern of the PCB 30. The rear-housing seat or pocket portion 210 is formed inwardly of the front housing 20 on its rear surface.

The pocket portion 210 has a bottom surface 212 that determines the depth of insertion of the rear housing 50 by its insertion portion 530 and in particular, its front surface 512. The pocket portion 210 of the front housing 20 is formed with side surfaces 216 to which the insertion portion 530 of the rear housing 50 is press-fitted by its side surfaces 516. Taking account of the metal powder injection molding process used for manufacturing the camera module housing, the bottom surface 212 and the side surfaces 216 of the pocket portion 210 are configured to jointly form an inside corner 214 having a corner radius of at least about 0.1 mm. In addition, the pocket portion 210 of the front housing 20 has a top surface 220, while the insertion portion 530 of the rear housing 50 has a rear surface 518. The pocket portion 210 is formed to have a depth 218 which is determined to be equal to a thickness 522 of the insertion portion 530 of the rear housing 50 so that, once the insertion portion 530 is seated in the pocket portion 210, the top surface 220 of the pocket portion 210 lies flush with the rear surface 518 of the insertion portion 530 to establish the welding site.

The insertion portion 530 is shaped to protrude laterally from the rear housing 50 at its front edge. The front surface 512 of the insertion portion 530 is assembled to abut the bottom surface 212 of the pocket portion 210 of the front housing 20. As described above, the thickness 522 of the insertion portion 530 between the front surface 512 and the rear surface 518 is formed to be the same as the depth 218 of the pocket portion 210.

At least a partial side region facing forward from edges formed by the rear surface 518 and the side surfaces 516 of the insertion portion 530 is formed to be substantially perpendicular to the front surface 512 of the insertion portion 530. The shape of the side portion of the insertion portion 530 is determined to have a size tolerance that may be press-fit into the sides of the pocket portion 210. The partial side region is defined as a press-fit surface 516 of the insertion portion 530. The press-fit surface 516 may have its width 522 in the front-rear direction set to be similar to the depth of a heat-affected zone (HAZ) due to laser welding. The press-fit surface 516 and the counterpart side surfaces 216 of the pocket 210 may be under residual stress generated therein after press-fitting, and therefore approximating the width 522 of the press-fit surface 516 and the depth of the HAZ can eliminate the residual stress inside the laser welding site after welding.

Between the press-fit surface 516 of the insertion portion 530 and the front surface 512, a first tapered surface 514 is formed so that the side profile of the insertion portion 530 is reduced toward the front surface 512. The first tapered surface 514 facilitates entry of the insertion portion 530 into the pocket portion 210 in an automated process of press-fitting the rear housing 50 into the front housing 20. In addition, a larger radius of curvature may be allowed for the inner corner 214 formed by the bottom surface 212 and the side surfaces 216 of the pocket 210. Since the front housing 20 is manufactured by the metal powder injection molding, the larger the radius of curvature of the corner 214, the more advantageous.

The insertion portion 530 of the rear housing 50 is a flange-like outward protrusion that mates with the front housing 20. The formation bridging between the partial side region and the front surface 512 of the insertion portion 530 is the first tapered surface 514, and the press-fit surface 516 is formed substantially perpendicular to the rear surface 518 and is press-fit into the side surfaces 216 of the pocket portion 210. The rear surface 518 of the rear housing 50 and the top surface 220 of the pocket portion 210 are assembled to be coplanar to form their welding site to be laser-welded.

Figure 7:
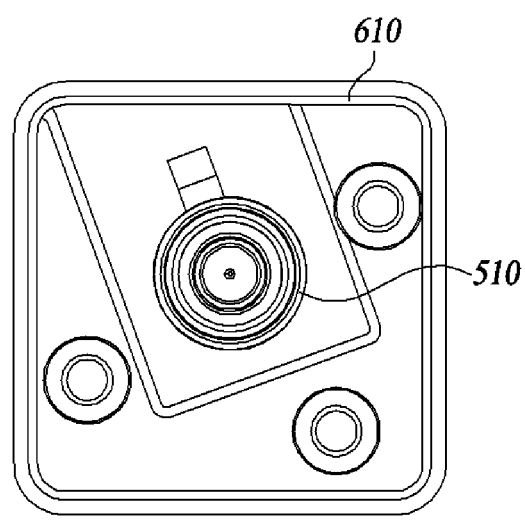
FIG. 7 is a plan view showing a welding site of a front housing and a rear housing according to at least one embodiment of the disclosure.

FIG. 7 is a plan view showing a welding site 610 of a front housing and a rear housing according to at least one embodiment of the disclosure.

Figure 8:
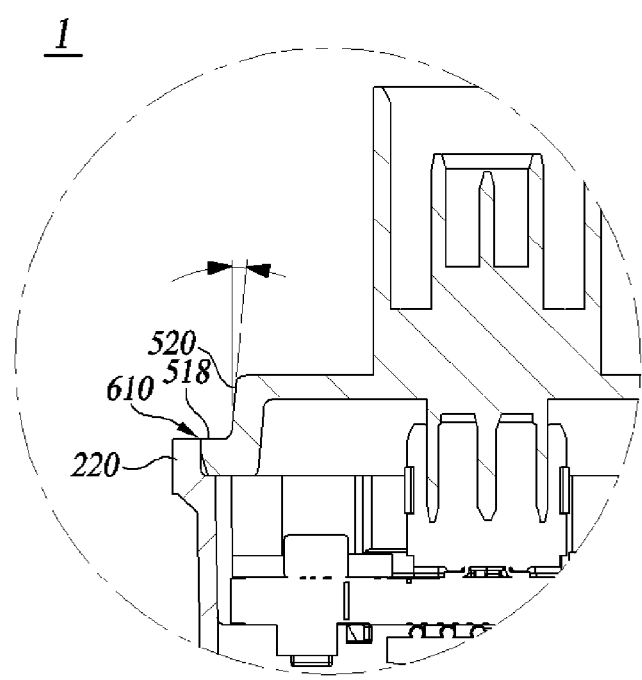
FIG. 8 is a partially enlarged cross-sectional view showing the welding site of the front housing and the rear housing according to at least one embodiment of the disclosure.

FIG. 8 is a partially enlarged cross-sectional view showing the welding site 610 of the front housing and the rear housing according to at least one embodiment of the disclosure.

The press-fit surface 516, according to at least one embodiment, is determined to be a minimum width in consideration of HAZ, the heat-affected zone. The front of the press-fit surface 516 is formed as the first tapered surface 514, so that when the insertion portion 530 is press-fit into the pocket portion 210, an assembly line in a closed curve, i.e. the welding site 610 may be formed to surround the outsides of the front housing 20 and the rear housing 50, thereby easily providing a highly reliable sealing.

The rear housing 50 may be formed to have a second tapered surface or primary side surface 520 extending from an inside corner of the rear surface 518 to the rear of the rear housing 50. The camera module 1 is completed by assembling the rear housing 50 to the front housing 20 after the lens module 10 and the PCB 30 are optically aligned. For accurate optical alignment, a master chart, including a test pattern for calibration, may be disposed of in front of the lens module 10, and 6-axis optical alignment may be performed by determining an alignment error by using the image sensor 40. In the front housing 20, the lens module 10 is assembled first, followed by pre-assembling the PCB 30, including the image sensor 40, which is then calibrated and corrected before assembling the PCB 30. Considering the general structure and process of the optical alignment platform in which a series of operations are performed, laser equipment for laser welding is disposed of in the rear space of the rear housing 50 to irradiate the laser to be incident substantially perpendicular to and onto the rear surface 518 of the rear housing 50. In this case, the second tapered surface 520 that is the primary side surface of the rear housing 50 is preferably so formed as shown in the embodiment of FIG. 8 not to be affected by the laser.

Figure 9A:
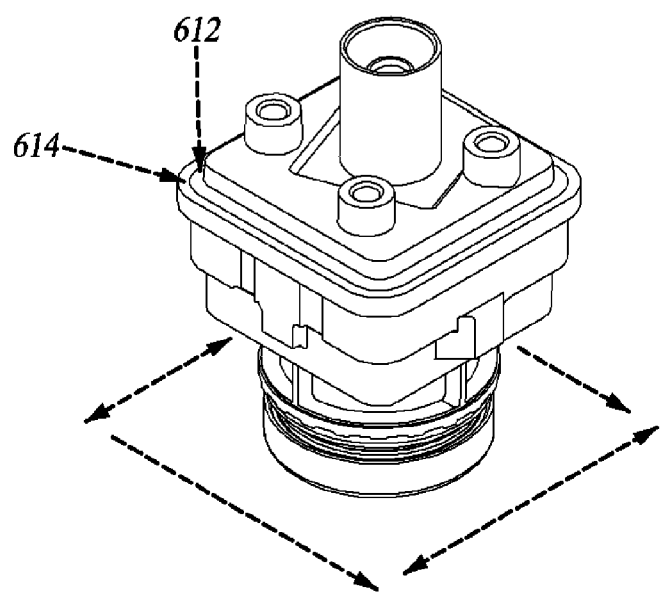
FIGS. 9A and 9B are conceptual diagrams showing two different processes of welding a front housing and a rear housing according to at least one embodiment of the disclosure.
Figure 9B:
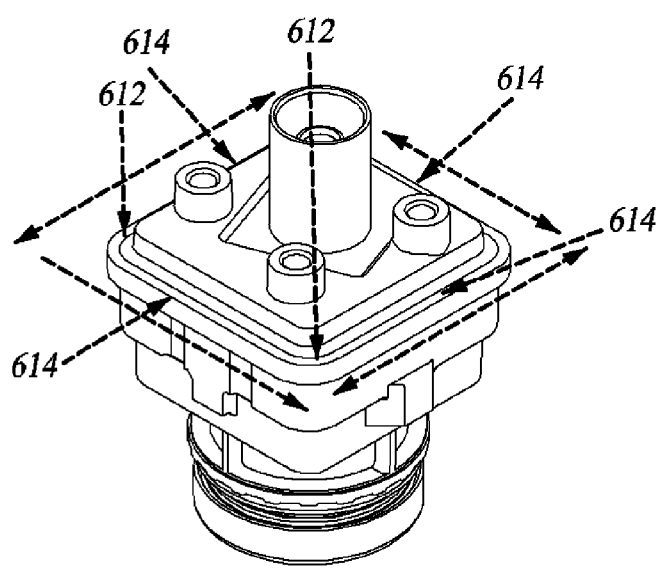

FIGS. 9A and 9B are conceptual diagrams showing two different processes of welding a front housing and a rear housing according to at least one embodiment of the disclosure.

As shown in FIGS. 9A and 9B, laser welding may be performed by a laser beam irradiated to be incident on the rear housing 50 from the rear thereof and along the welding site 610. FIG. 9A illustrates a case in which laser welding is performed along the welding site 610 by moving a stage on which the camera module housings 20 and 50 are fixed while a laser equipment position 612 is fixed. A shield gas jet 614 for maintaining the atmosphere of the welding region inert is aimed at a fixed welding point. FIG. 9B shows a case in which the laser beam performs the welding operation along the welding site 610 by moving the laser equipment position 612 while the camera module housings 20 and 50 are fixed. The shield gas jet 614 may be configured to surround the entire welding site.

In the vehicle camera module according to at least some embodiments of the disclosure, the front housing and the rear housing are manufactured by Metal Injection Molding (MIM) and generally have intricate shapes with thinness suitable for accommodating components in the housing assembly while excluding such defects as pores from the metallic housing assembly, thereby significantly lowering the possibility of defects in the weld between the front housing and the rear housing.

In addition, the overall thickness of the housing assembly can be made thin to secure a broader internal space, which provides a wider area for the placement of a circuit board or the like. In addition, with the use of materials such as stainless steel, which do not require additional surface treatment in the manufacture of the housings, there is no need for additional rust prevention for the laser welding site, thereby reducing the production cost. Further, a connector fastening portion can be integrally formed in the housing to secure the manufacturing quality more easily than in the conventional case where the connector structure is subject to post-processing after casting the housing.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A vehicle camera module, comprising:
a lens module;
a circuit board including an image sensor;
a front, metal powder injection molded housing having a front side assembled with the lens module and a rear side assembled with the circuit board configured to be received within the front housing; and
a rear, metal powder injection molded housing assembled to the rear side of the front housing,
the front housing having a rear surface and including a pocket portion formed inward toward the front side, and
the rear housing including front edges and protrusions extending in lateral directions from the front edges and an insertion portion accommodated in the pocket portion,
wherein:
the insertion portion of the rear housing has a rear surface and side surface with jointly formed edges, and the side surface having at least a partial side region extending from the edges and facing forwardly of the rear housing to be substantially perpendicular to a front surface of the insertion portion, the partial side region defining a press-fit surface; and
the press-fit surface has a width in a front-rear direction determined by a depth of a heat-affected zone due to a laser welding to eliminate residual stress from the press-fit surface after the laser welding, the width of the press-fit surface being equal to or less than the depth of the heat-affected zone.

2. The vehicle camera module of claim 1, wherein the insertion portion of the rear housing is press-fit into the pocket portion so that the insertion portion and the pocket portion cooperatively define a press-fit site to seal the front housing and the rear housing completely.

3. The vehicle camera module of claim 1, wherein the insertion portion comprises a first tapered surface extending from the press-fit surface to the insertion portion so that the insertion portion has a reduced side profile toward the front surface of the insertion portion.

4. The vehicle camera module of claim 1, wherein the pocket portion has a depth that is substantially equal to a thickness of the insertion portion.

5. The vehicle camera module of claim 1, wherein the pocket portion of the front housing has a bottom surface and side surfaces jointly forming an inside corner having a corner radius of about 0.1 mm or more.

6. The vehicle camera module of claim 1, wherein the front housing has a thickness of about 0.5 mm to about 1.0 mm and a wall gradient of about 0.5° to about 1°.

7. The vehicle camera module of claim 1, wherein the rear housing is integrally formed with at least a portion of a standard radio frequency (RF) connector structure made by any one of USCAR17, USCAR18-4, and Fachkreis Automobil standards.

8. The vehicle camera module of claim 1, wherein the metal injection molding method utilizes a powdered metallic material comprising at least one of SUS 316L, SUS 304L, SUS 630, SUS 420 J2, SUS 440C, and SKD 11 per Japanese Industrial Standard, 2% Ni—Fe, 7% Ni—Fe, and HK30 per ASTM standard.

9. A vehicle camera module, comprising:
a lens module;
a circuit board including an image sensor;
a front, metal powder injection molded housing having a front side assembled with the lens module and a rear side assembled with the circuit board configured to be received within the front housing; and
a rear, metal powder injection molded housing assembled to the rear side of the front housing,
the front housing having a rear surface and including a pocket portion formed inward toward the front side, and
the rear housing including front edges and protrusions extending in lateral directions from the front edges and an insertion portion accommodated in the pocket portion,
wherein the rear housing has a primary side surface extending from an inside corner of the rear surface of the rear housing to a rear of the rear housing so that the primary side surface comprises a second tapered surface.

10. A vehicle camera module, comprising:
a lens module;
a circuit board including an image sensor;
a front, metal powder injection molded housing having a front side assembled with the lens module and a rear side assembled with the circuit board configured to be received within the front housing; and
a rear, metal powder injection molded housing assembled to the rear side of the front housing,
the front housing having a rear surface and including a pocket portion formed inward toward the front side, and
the rear housing including front edges and protrusions extending in lateral directions from the front edges and an insertion portion accommodated in the pocket portion,
wherein the circuit board is configured to dissipate heat, the circuit board having a ground pattern at least partially extending to a side surface of the circuit board wherein the ground pattern contacts an inner surface of the front housing when the circuit board is assembled within the front housing and thereby transfers heat generated from the circuit board to the front housing.

11. A method of making a vehicle camera module, the method comprising the steps of:
providing a lens module;
providing a circuit board including an image sensor;
manufacturing a front housing and a rear housing by metal powder injection molding;
assembling the front housing having a front side with the lens module and assembling the rear side with the circuit board housed within the front housing; and
assembling the rear housing to the rear side of the front housing,
wherein:
the front housing has a rear surface and includes a pocket portion formed inward toward the front side, and the rear housing is formed to have front edges and protrusions extending in lateral directions from the front edges and includes an insertion portion accommodated in the pocket portion;
the insertion portion of the rear housing has a rear surface and side surface with jointly formed edges, and the side surface having at least a partial side region extending from the edges and facing forwardly of the rear housing to be substantially perpendicular to a front surface of the insertion portion, the partial side region defining a press-fit surface and
the press-fit surface has a width in a front-rear direction determined by a depth of a heat-affected zone due to a laser welding to eliminate residual stress from the press-fit surface after the laser welding, the width of the press-fit surface being equal to or less than the depth of the heat-affected zone.

12. The method of claim 11, further comprising the step of, after assembly, seal and assemble the front housing and the rear housing together by laser welding irradiating along a rear side of the rear housing.

* * * * *